United States Patent [19]
Gerges

[11] 4,213,006
[45] Jul. 15, 1980

[54] CIRCUIT ARRANGEMENT FOR THE COARSE SYNCHRONIZATION OF CARRIER SIGNALS AND PULSE SIGNALS WITH DATA SIGNALS IN A DATA RECEIVER

[75] Inventor: André Gerges, Munich, Fed. Rep. of Germany

[73] Assignee: Siemens Aktiengesellschaft, Berlin & Munich, Fed. Rep. of Germany

[21] Appl. No.: 861,000

[22] Filed: Dec. 15, 1977

[30] Foreign Application Priority Data

Dec. 21, 1976 [DE] Fed. Rep. of Germany ....... 2657914

[51] Int. Cl.² ..................... H04L 27/06; H04L 25/36
[52] U.S. Cl. ..................................... 375/97; 328/155; 375/118
[58] Field of Search .................. 178/69.1, 53; 179/15 BS; 328/63, 72, 73, 75, 155; 329/50, 104; 325/321

[56] References Cited

U.S. PATENT DOCUMENTS

| | | | |
|---|---|---|---|
| 3,517,319 | 6/1970 | Drogin | 328/74 |
| 4,087,756 | 5/1978 | Rogers, Jr. | 329/50 |
| 4,090,145 | 5/1978 | Webb | 329/50 |

Primary Examiner—Benedict V. Safourek
Attorney, Agent, or Firm—Hill, Van Santen, Steadman, Chiara & Simpson

[57] ABSTRACT

A circuit arrangement for the coarse synchronization of carrier signals and pulse signals with data signals in a data receiver is disclosed in which data signals modulated by a data transmitter are received and in which a carrier regulation stage generating the carrier signals, a pulse regulation stage for varying the phase of pulse signals, a demodulator demodulating the modulated data signals, using the carrier signals, and a sampler for sampling the demodulated data signals, using the pulse signals, and wherein a switching stage, which receives sampled data signals generated by the sampler, delivers to a carrier regulation stage first control signals altering the phase of the carrier signals and to a pulse regulation stage second control signals altering the phase of the pulse signals, as long as the difference between the momentary values of the sampled data signals and their theoretical values averaged over a prescribed duration of time exceeds a prescribed threshold value.

5 Claims, 4 Drawing Figures

CIRCUIT ARRANGEMENT FOR THE COARSE SYNCHRONIZATION OF CARRIER SIGNALS AND PULSE SIGNALS WITH DATA SIGNALS IN A DATA RECEIVER

BACKGROUND OF THE INVENTION

1. Field of the Invention

The present invention relates to a circuit arrangement for the coarse synchronization of carrier signals and pulse signals with data signals in a data receiver which receives data signals modulated by a data transmitter, and more particularly to an arrangement wherein the data receiver contains a carrier regulation stage generating the carrier signals, a pulse regulation stage generating the pulse signals, a demodulator demodulating the modulated data signals, by the carrier signals, and a sampler for sampling the demodulated data signals, using the pulse signals.

2. Description of the Prior Art

In a high-speed transmission of data by way of band-limited channels, single-sideband signals are often used. Transmission is effected, for example, with 64 kBit/s, by way of primary group connections, using amplitude modulation with partial response pulses of the class IV. The use of partial response pulses for the transmitting of data is already generally known in the art and has, for example, already been described in the publication of E. R. Kretzmer titled "*Generalization of a Technique for Binary Data Communication*", published in the IEEE Transactions on Communication Technology, COM-14 (1966), pp. 67 and 68. The partial response pulses are frequently designated as partial information pulses.

In the transmission of data in the primary group band of the carrier frequency long-distance traffic network, data are transmitted using amplitude modulation. In a data transmitter, partial response pulses are assigned to data emitted by a data source. Subsequently, there follows an amplitude modulation of the partial response pulses with the aid of carrier signals. The modulated data signals are transmitted to a data receiver which recovers the transmitted data. The data receiver contains a demodulator which demodulates the modulated data with the aid of further carrier signals. The demodulated data signal is sample at prescribed points in time with the aid of pulse signals. In a decoder the transmitted data are recovered from the sample data signals, and are fed to a data output.

In a carrier regulation stage or, respectively, a pulse regulation stage, the carrier signals and the pulse signals are continuously synchronized with the transmitted data signals. The capture range of these regulation stages is generally not large, however, so that an in-synchronization condition is not guaranteed at the beginning of a data transmission. For the in-synchronization condition of the carrier signals and of the pulse signals, it is already known to first transmit single pulses from the data transmitter to the data receiver. The intervals of the individual pulses are so great that they do not mutually influence one another. From the form of the pulses it is possible to derive regulation criteria with which an in-synchronization condition is made possible even with arbitrary beginning values of the carrier phase and of the pulse phase.

In the known coarse synchronization, not only must the transmission of data from the transmitter to the receiver be interrupted in one direction, but also in the opposite direction, since information must go to the transmitter from the receiver that a coarse synchronization is necessary. The two transmission directions are therefore no longer independent of each other in this case.

SUMMARY OF THE INVENTION

The present invention, therefore, has the primary object of providing a circuit arrangement for coarse synchronization of data carrier signals and pulse signals with data signals, wherein the circuit arrangement operates with a random data text, i.e. without the use of a particular synchronization symbol sequence.

According to the invention, the above object is achieved in a circuit arrangement of the type generally set forth above, and that a switching stage is provided in which, at its input side, sampled data signals generated by sampler are present, and which delivers, to the carrier regulation stage, first control signals which alter the phase of the carrier signals and, to a pulse regulation stage, second control signals which alter the phase of the pulse signals, as long as the difference, averaged over a prescribed period of time, between the momentary values of the sampled data signals and their desired values exceeds a prescribed threshold value.

A circuit arrangement constructed in accordance with the present invention has the advantage that the carrier signals and the pulse signals are very quickly synchronized with the transmitted data signals. At the beginning of the transmission of data or in case of a change in the transmission path, such as, for example, as a result of substitute switching of radio links, it cannot be expected that the carrier phase and the pulse phase will already lie in the capture range of the carrier regulation stage and the pulse regulation stage. A slow in-synchronisation of the carrier regulation stage and of the pulse regulation stage is avoided.

The difference between the momentary values of the sampled data signals and their theoretical values is determined in an advantageous manner if the switching stage contains a differentiation stage in which the sampled data signals and the theoretical value signals are present, and which delivers error signals which correspond to the difference between the sampled data signals and the theoretical value signals.

For generating the first and second control signals, it is advantageous if the switching stage contains a rectifier, which recitifies the error signals, and contains an integrator connected behind the rectifier, which integrates the rectified error signals over several period durations of the pulse signals. It is particularly advantageous if the rectifier is embodied as a full-wave rectifier.

In order to be able to reach a decision as to when the coarse synchronization is completed and a fine synchronization can being, it is advantageous if the switching stage contains a comparator which delivers a blocking signal to a control stage generating the control signals, the blocking signal effectively blocking the control signals if and when the error signals fall below the prescribed threshold value.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
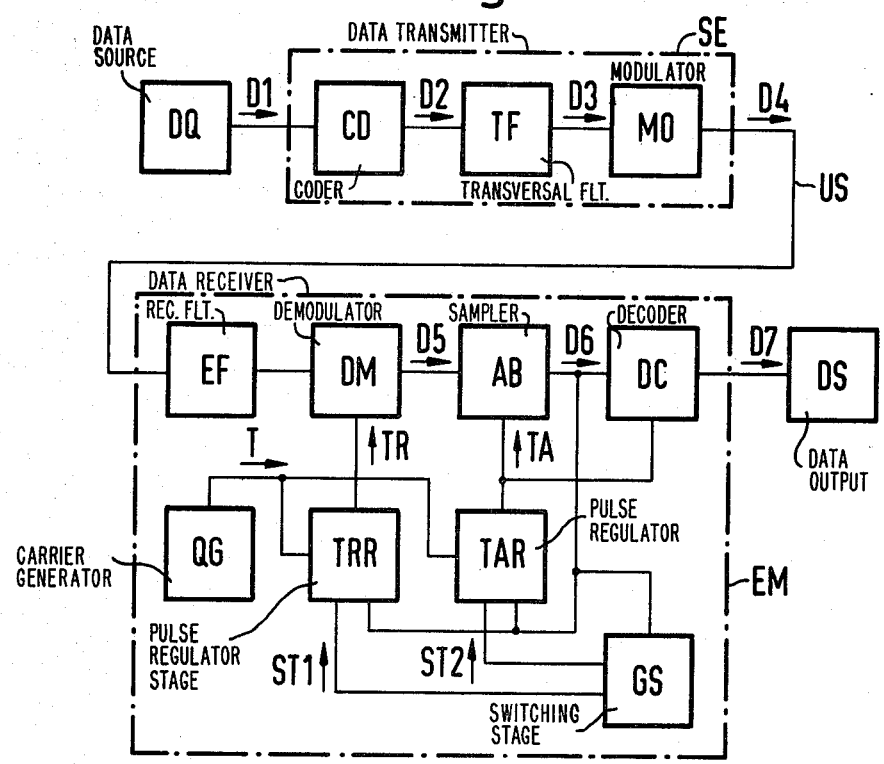
FIG. 1 is a block circuit diagram of a data transmission arrangement.

The data transmission arrangement represented in FIG. 1 comprises a data source DQ, a data transmitter SE, a transmission line US, a data receiver EM and a data sink or output DS. The data source DQ delivers data to the data transmitter SE in the form of binary coded data signals D1. The data transmitter SE contains a coder CD, a transversal filter TF and a modulator MO. The coder CD effects a precoding of the data signals D1, according to which each binary value of a data signal D2 emitted at its output is formed from the sum modulo 2 of the simultaneously occurring binary value of the data signal D1 and of the binary value of the data signal D2 which occurred two pulse periods earlier. The data transmitter SE further comprises a transversal filter TF which allocates a partial response pulse to each 1 value of the data signal D2. No partial response pulse is allocated to each 0 value of the data signal D2. The data signals D3 at the output of the transversal filter TF, which are formed from the partial response pulses, are delivered to a modulator MO which, by means of amplitude modulation and a single-sideband transmission, transmits corresponding data signals D4 to the data receiver EM over the transmission line US.

The precoding of the data signals and the generation of the partial response pulses in the transversal filter TF are already known and are described, for example, in the publication by A. Tannhauser and A. Gerges entitled "*A Process for Data Transmission on Primary Group Connections,*" Nachrichtentechnische Zeitschrift 29 (1976), issue 6, pp. 449–452.

The data receiver EM contains a receiving filter EF to which the transmitted data signals D4 are fed. The output of the receiving filter EF is connected to a demodulator DM, which demodulates the transmitted data signals D4 with the aid of carrier signals TR. The demodulator DM delivers demodulated data signals D5 to a sampler AB. The scanning stage AB scans the demodulated data signals D5 with the aid of pulse signals TA. At the output of the sampler AB sampled data signals D6 are emitted, whose momentary values are allocated to the momentary values of the demodulated data signals D5 at the sampling times given by the pulse signals TA. The sampled data signals D6 are delivered, on the one hand, to a decoder DC which delivers the received data to the data output DS in the form of decoded data signals D7. On the other hand, the sampled data signals D6 are fed to a carrier regulation stage TRR, to a pulse regulation stage TAR and to a switching stage GS, for coarse, synchronization.

With the aid of timing signals T generated in a quartz generator QG, the carrier regulation stage TRR generates the carrier signals TR which are fed to the demodulator DM. Also with the aid of the timing signals T the pulse regulation stage TAR generates the pulse signals TA which are fed to the sampler AB. The phases of the carrier signals TR and of the pulse signals TA are regulated, for example, by mixing in additional timing pulses between the timing pulses T, in the carrier regulation stage TRR and in the pulse regulation stage TAR, or by extracting one or more timing pulses.

With the aid of the sampled data signals D6, the switching stage GS generates first control signals ST1 and second control signals ST2, which are fed to the carrier regulation stage TRR or, respectively, to the pulse regulation stage TAR, and with which a coarse synchronization of the carrier signals TR or, respectively, of the pulse signals TA occurs.

Figure 2:
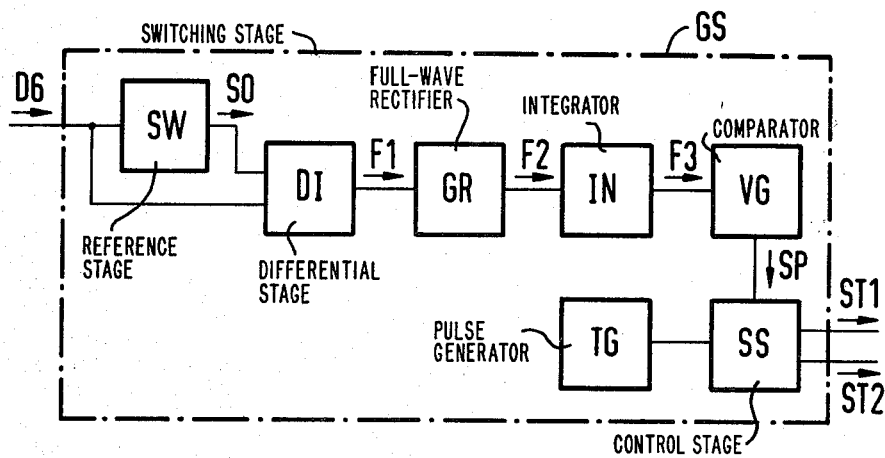
FIG. 2 is a block circuit diagram of a switching stage for the coarse synchronization.

The switching stage GS represented in FIG. 2 contains a theoretical value provider SW, a differential stage D1, a rectifier GR, an integrator IN, a comparator VG, a pulse generator TG and a control stage SS. The sampled data signals D6 are fed, on the one hand, to the theoretical value provider SW and, on the other hand, to the differential stage D1. The theoretical value provider SW generates theoretical value signals SO, whose momentary values are allocated to the theoretical values of the data signals D6. The differential stage D1 generates error signals F1 which indicate the deviations of the data signals D6 from the theoretical value signals SO. These error signals F1 are rectified in a rectifier GR, which is preferably embodied as a full-wave rectifier, and are delivered to an integrator IN as error signals F2. The integrator IN integrates the error signals F2 over respectively a prescribed number of period durations of the data signals D6 and delivers, at its output, integrated error signals F3 to a comparator VG. These integrated error signals F3 represent the average absolute error of the data signals D6.

Respectively, at the end of an integration period the comparator VG compares this average absolute error to a prescribed threshold value and delivers a blocking signal SP to the control stage SS, which generates the control signals ST1 and ST2 with the aid of timing pulses delivered by a pulse generator TG. If and when the average absolute error is smaller than the prescribed threshold value, a blocking signal SP blocks the control stage SS, and no more control signals ST1 or ST2 are emitted. In this case, the coarse synchronization is ended, and only a fine synchronization by the carrier regulation stage TRR and the pulse regulation stage TAR still ensues. Further details of the switching stage represented in FIG. 2 are described in the following, together with the timing diagrams represented in FIG. 3.

Figure 3:
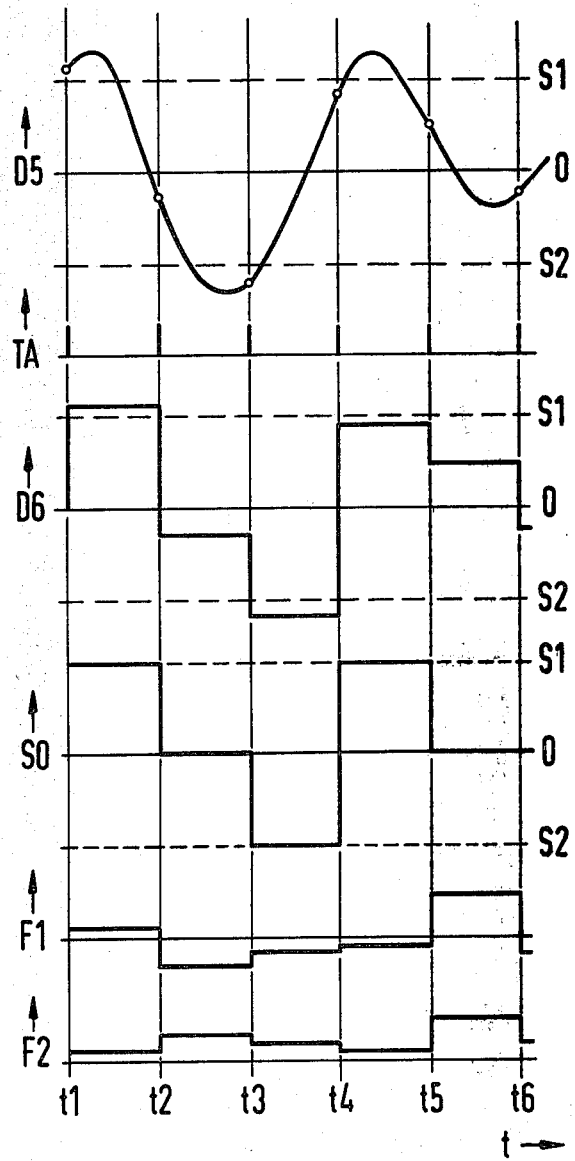
FIG. 3 is a timing diagram of signals at various points of the switching stage of FIG. 2.

In the timing diagrams illustrated in FIG. 3, the time "t", in the abscissa direction, and the momentary values, in the ordinate direction, of signals are represented at various points of the data receiver EM and of the switching stage GS.

The demodulated data signal D5 deviates from its theoretical values 0, S1 and S2 at the sampling times t1 to t6, which are prescribed by the occurrence of the pulse signals TA, prior to the coarse synchronization by the switching stage GS. The momentary values of the data signals D5 at the sampling times are represented by the data signals D6, which are emitted at the output of the sampler AB. The theoretical value circuit SW in the switching stage GS generates, from the sampled data signals D6, the theoretical value signals SO which can assume the theoretical values 0, S1 or S2. The theoretical value signals SO are, in the process, generated from the sampled data signals by respectively investigating whether the sampled data signal lies closer to the value 0, to the theshold value S1 or the the threshold value S2. The differentiation stage DI generates the error signals F1 which respectively represent the difference between the sampled data signals D6 and the thoretical value signals SO. These error signals F1 are rectified in the rectifier GR, and at the output the error signals F2 are emitted. After the integration of these error signals in the integrator IN, the blocking signal SP is generated which releases or, respectively, blocks the control stage SS. The control signals ST1 and ST2, which are delivered to the carrier regulation stage TRR and to the pulse regulation stage TAR indicate the adjustment step size for the carrier phase and the pulse phase. These control signals ST1 and ST2 can, for example, by control voltages for a voltage-controlled oscillator or single pulses which are mixed in or, respectively, extracted from between the timing pulses T used for generating the carrier signals TR and the pulse signals TA.

Figure 4:
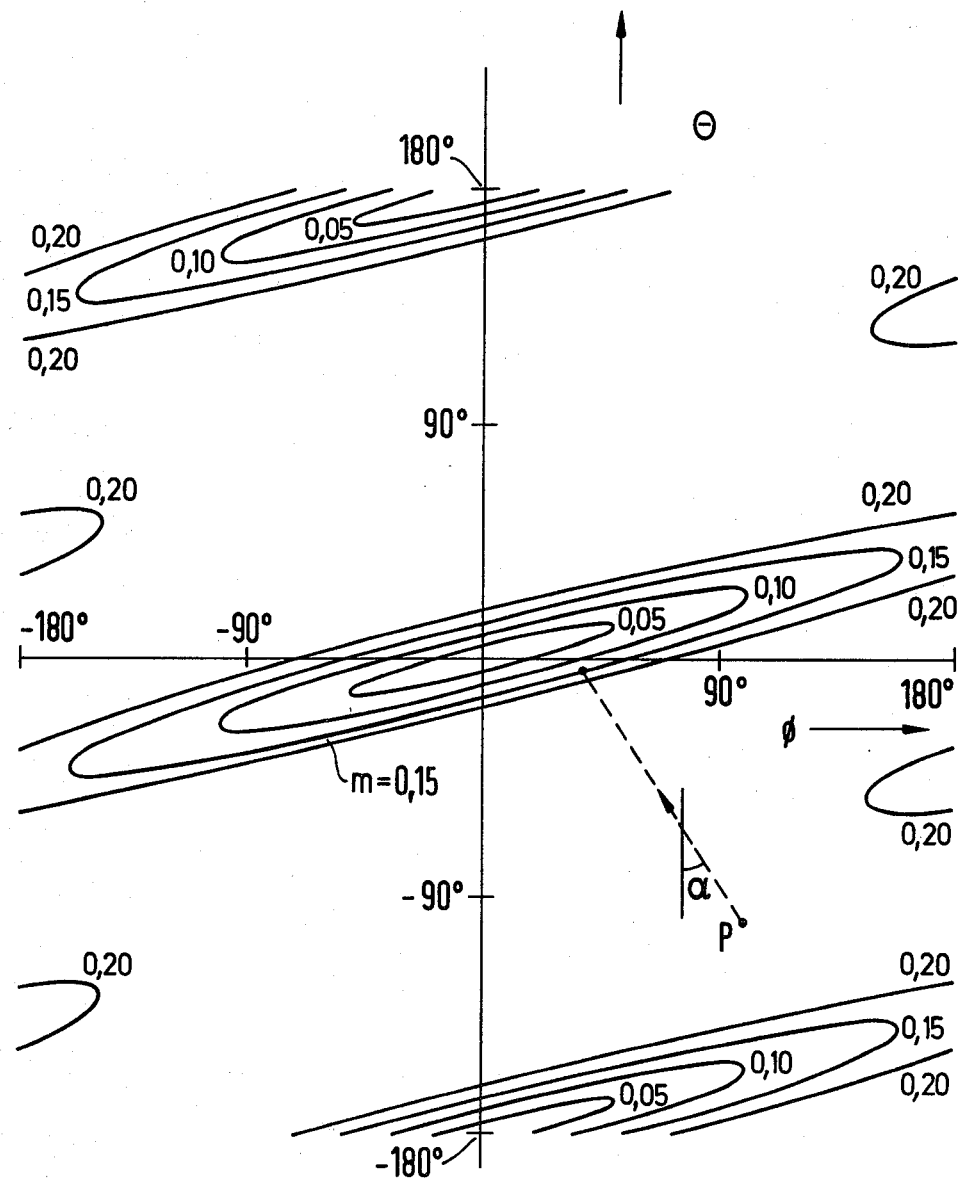
FIG. 4 is a graphic illustration of average absolute error, represented in the form of contour lines, the error occurring as a function of the carrier phase and pulse phase in the transmission of a random data text.

In the average absolute error "m", represented in FIG. 4 as a function of the carrier phase and of the pulse phase, the pulse phase $\phi$ is represented in the abscissa direction and the carrier phase $\theta$ is represented in the ordinate direction. The average absolute error represents a surface which is characterized by the contour lines represented in FIG. 4. The surface constantly repeats itself, not only in the abscissa direction, but also in the ordinate direction, since in each case a phase angle of 180° corresponds to a phase angle of −180°. The parameter "m" for the contour lines is normalized to the amount of the theoretical value S1 or, respectively, S2, and in FIG. 4 contour lines are represented up to a value of "m"=0.2. For example, in case the capture range of the carrier regulation stage TRR and of the pulse regulation stage TAR extends to an average absolute error of "m"=0.15, the carrier regulation stage TRR and the pulse regulation stage TAR are influenced with the aid of the control signals ST1 and ST2 until the average absolute error is less than 0.15.

At the beginning of the transmission of data, the data carrier phase $\theta$ and the pulse phase $\phi$ can assume an arbitrary value between −180° and +180°. By means of the control signals ST1 and ST2 the carrier signals TR and the pulse signals TA are simultaneously adjusted in such a manner that the corresponding contour line is reached as rapidly as possible. In FIG. 4, for example, a starting point is designated as P, and by means of simultaneous adjustment of the carrier phase $\theta$ and of the pulse phase $\phi$ the corresponding contour line is reached along the line illustrated as a broken line. The angle $\alpha$ occurring between the line illustrated as a broken line and the ordinate is, in the process, formed by the fixedly prescribed adjustment step sizes of the carrier phase $\theta$ and the pulse phase $\phi$. When the corresponding contour line is reached, the coarse synchronization is switched off, and no more control signals ST1 and ST2 are emitted. The following fine synchronization of the carrier signals TR and of the pulse signals TA is taken over by the carrier regulation stage TRR or, respectively, the pulse regulation stage TAR.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim as my invention:

1. A circuit arrangement for the coarse synchronization of carrier signals and pulse signals with data signals in a data receiver which receives modulated data signals comprising:
    a source of carrier signals;
    a carrier phase regulation stage connected to said source of carrier signals;
    a demodulator, including an input for receiving data modulated carrier signals and an input connected to the output of said carrier phase regulation stage, for demodulating the received signals;
    a pulse regulation stage for altering the phase of pulse signals;
    a sampler connected to said demodulator, to said pulse regulation stage and to said carrier phase regulation stage for sampling the demodulated signals and providing sampled data signals having momentary values of the demodulated data signals;
    a decoder connected to said sampler to decode the sampled data signals and provide decoded output data; and
    a switching stage connected to said sampler and to said carrier and pulse regulation stages, said switching stage providing first control signals to said carrier phase regulation stage for altering the carrier phase and second control signals to said pulse regulation stage for altering the pulse phase in response to and as long as the difference between the momentary values of the sampled data signals and the predetermined theoretical values, averaged over a predetermined duration exceeds a predetermined threshold value.

2. The circuit arrangement of claim 1, wherein said switching stage comprises:
    a difference stage connected to receive the sampled data signals and the theoretical data signals and responsive thereto to provide error signals corresponding to the difference between the sampled data signals and the theoretical data signals.

3. The circuit arrangement of claim 2, wherein said switching stage further comprises:
    a rectifier connected to said difference stage to rectify the error signals; and
    an integrator connected to said rectifier to integrate the rectified error signals over several periods of the pulse signals.

4. The circuit arrangement of claim 3, wherein said rectifier is a full-wave rectifier.

5. The circuit arrangement of claim 3, wherein said switching stage further comprises:
    a comparator connected to said integrator for producing a blocking signal in response to the error signals falling below the predetermined threshold value; and
    a control stage for generating said first and second control signals, said control stage connected to said comparator and responsive to said blocking signal to cease emission of said first and second control signals.

* * * * *